Patented Aug. 1, 1950

2,517,351

UNITED STATES PATENT OFFICE 2,517,351

THERMOPLASTIC COMPOSITIONS PLASTICIZED WITH AN ESTER OF 3,5,5-TRIMETHYL-1-HEXANOL

Hugh G. Reid, Norton-on-Tees, England, assignor to Imperial Chemical Industries Limited, a corporation of Great Britain No Drawing. Application August 26, 1948, Serial No. 46,362. In Great Britain September 8, 1947

7 Claims. (Cl. 260—31.8)

This invention relates to new compositions, and more particularly to compositions containing organic thermoplastic materials and shaped articles manufactured from such compositions. The invention is concerned with compositions containing one or more organic thermoplastic materials and one or more plasticisers therefor.

A wide variety of plasticisers have previously been proposed for incorporation into compositions comprising organic thermoplastic materials. Thus, for example, numerous esters, such as certain phthalates, for examples, cyclohexyl, octyl and dodecyl phthalates, phosphates, glycollates and citrates have been used as plasticisers for different organic thermoplastic materials, including cellulose derivatives, for example, cellulose acetate, cellulose acetobutyrate, cellulose nitrate or nitrocellulose, and ethyl cellulose, polymers and interpolymers of various unsaturated compounds, for example, vinyl chloride and vinyl acetate, and derivatives of such polymers and interpolymers, for example, partially or completely hydrolysed polymers and interpolymers of vinyl acetate and the corresponding acetal derivatives, and halogenated polymers of ethylene. The choice of plasticiser to be used depends on a variety of factors, such as the particular thermoplastic material to be plasticised, and the use to which the resultant composition is to be put. The plasticiser must be sufficiently compatible with the organic thermoplastic material and must be undissolved and stable in the presence of any substances with which the composition is likely to come into contact. Furthermore, the plasticiser must be retained in the composition under a wide variety of conditions.

The nature and the proportion of plasticiser used in a given composition will affect the physical properties of the composition, for example, the flexibility, electrical resistivity, softening-point, and toughness, and to some extent the chemical properties such as stability and inflammability. In addition to plasticisers, plasticiser extenders such as chlorinated paraffin waxes as described in British patent specifications Nos. 573,840, 573,841 and 579,550 may be incorporated, for example, to increase the compatibility of a true plasticiser for the thermoplastic material or to reduce the flexibility of the composition. Whilst for most purposes it is usually possible to select a suitable plasticiser from those already known, for some applications known plasticisers are not completely satisfactory, and it is usually necessary to compromise between a number of different plasticisers for a particular purpose, consideration being given to physical properties, availability and cost.

An object of this invention is to provide new compositions of matter comprising organic thermoplastic materials and plasticisers therefor. Another object of the invention is to provide such compositions from which may be produced articles of improved mechanical properties, for example, by calendering. A further object is to provide such compositions which shall be flexible yet have high volume electrical resistivity. Other objects will appear hereinafter.

These objects are accomplished according to the present invention by providing a composition comprising one or more organic thermoplastic materials and one or more esters, each ester being derived from a nonyl alcohol and a polybasic organic acid.

The organic thermoplastic material or materials may consist of one or more natural or synthetic resins, including, for example, cellulose derivatives such as cellulose nitrate or nitrocellulose, cellulose acetate, cellulose acetobutyrate, cellulose acetopropionate, ethyl cellulose and benzyl cellulose, polymers and interpolymers of compounds containing the vinylidene group (that is the group $CH_2=C<$), such as vinyl chloride, vinyl acetate, vinylidene chloride, and acrylic acid derivatives, for example, methyl methacrylate and acrylonitrile, certain derivatives of some of these polymers and interpolymers, such as acetals of hydrolysed polyvinyl ester derivatives, especially butyrals, halogenated solid polymers of ethylene, and synthetic rubbers such as neoprene and butadiene copolymers with styrene or acrylonitrile. The plasticisers of this invention are of particular value when the organic thermoplastic material used in the compositions of the present invention is a polymer or copolymer or vinyl chloride. In the case of nitrocellulose the preferred nonyl ester is the phthalate; in the case of ethyl cellulose the preferred nonyl ester is the adipate; in the case of polyvinyl chloride the phthalate is the preferred nonyl ester and in the case of vinyl chloride/vinyl acetate copolymers, for example, "Vinylite VYNS," the phthalate and adipate are preferred, but the sebacate is also of value; with halogenated polythene, for example, that known as "Halothene" grade 52/68/2, the phthalate, sebacate and adipate are of more or less equal merit; and in the case of polyvinyl acetal and butyral the phthalate is the preferred nonyl ester, although the adipate, and in the case of polyvinyl acetal the sebacate, are also of value as plasticisers for these polymers.

It is preferred that the nonyl alcohol from which the ester plasticiser is derived should consist primarily of 3,5,5-trimethyl-1-hexanol, $$CH_3.C(CH_3)_2.CH_2.CH(CH_3).CH_2.CH_2OH$$

since the esters of this isomer enhance the mechanical properties and electrical resistivity of compositions containing organic thermoplastic materials to a particularly high degree, but other isomeric nonyl alcohols may be present. Thus in the synthesis of 3,5,5-trimethyl-1-hexanol minor amounts of the other isomeric nonyl alcohols are almost invariably formed. It has been found, however, that the alcohol may be esterified to produce the nonyl ester plasticiser without removing the isomeric alcohols and without any substantial loss in properties. However, in addition to 3,5,5-trimethyl-1-hexanol the other isomeric alcohols are also suitable for the practice of this invention. As an additional advantage to those already mentioned, it has been found that compositions containing the phthalate of 3,5,5-trimethyl-1-hexanol are less likely to be discoloured than similar compositions containing other plasticisers such as 2-ethylhexyl phthalate. It has also been found that compositions of the invention containing polymers or interpolymers of vinyl chloride and vinylidene chloride are of improved heat-stability to previously known compositions of such polymers and interpolymers with plasticisers.

Polybasic organic acids suitable for forming the ester plasticisers of the invention include, for example, phthalic, adipic, sebacic, succinic, tartaric, citric, aconitic and tricarballylic acids. The preferred acids are phthalic, adipic, and sebacic acids, particularly phthalic acid.

The esters used in the invention include any ester of a nonyl alcohol with a polybasic acid or any mixed ester of a nonyl alcohol and one or more other alcohols preferably containing from 4 to 9 carbon atoms per molecule, for example, 2-ethyl hexanol, with a polybasic acid. By a judicious selection of the other alcohol or alcohols used it is possible to obtain a plasticiser suitable for any particular purpose within a wide range of applications.

The compositions of this invention may be in the form of solid moulding materials, pastes, lacquers, solutions or dispersions according to the proportions of the essential ingredients and other ingredients of the compositions. The relative amounts of the thermoplastic materials and the nonyl esters used in forming the compositions of the invention may be varied within wide limits according to the particular properties required. In general the amounts are similar to those used conventionally with other plasticisers, proportions of plasticiser in the compositions of from about 10 to 60% by weight, for example, being suitable for most purposes.

In addition to the organic thermoplastic materials and the nonyl ester plasticisers other ingredients may be present in the compositions of the invention if desired, for example, other plasticisers, plasticiser extenders such as chlorinated paraffin waxes, stabilisers, fillers and colouring materials. Thus with vinyl chloride polymers and interpolymers it is often desirable to include a substance which acts as a heat-stabiliser, and any heat-stabilisers for vinyl chloride polymers and interpolymers may be used in the compositions of the invention.

The compositions of the invention are suitable for all applications of previously known thermoplastic resin/plasticiser compositions, including, for example, moulding, extrusion, cable covering, coating applications such as in the manufacture of leathercloth, and the production of hollow articles such as by the methods described in British patent specifications Nos. 521,093; 591,611 and 600,270. Other applications and methods of fabrication for which these compositions are suitable are described in British patent specification No. 500,298. The compositions of the invention are particularly suitable for fabrication by calendering, the calendered products having improved mechanical properties when compared with compositions previously used for the production of articles by calendering thermoplastic compositions. Furthermore, the compositions of the invention have higher volume resistivity than compositions of similar flexibility containing previously known plasticisers. Another advantage of the compositions of the invention is that they have little tendency to lose plasticiser even over long periods of time, so that they do not deteriorate or age.

By employing mixtures of different nonyl esters of polybasic organic acids it is often possible to secure properties in the compositions which would be unobtainable otherwise. For example, a mixture of dinonyl adipate and dinonyl phthalate has better low temperature flexibility than dinonyl phthalate alone but is much more easily compounded than dinonyl adipate alone.

The invention is illustrated but in no way limited by the following examples, in which all parts are by weight.

Example 1

100 parts of polyvinyl chloride were compounded with 50 parts of the phthalate of 3,5,5-trimethyl-1-hexanol. The composition gave excellent products when calendered, and had the following properties:

B. S. hardness _____ 25
Tensile strength in lbs./sq. in. _____ 2700
Percent elongation at break _____ 370
Volume resistivity in ohm. cm. _____ c. a. $2 \times 10^{14}$

Example 2

A composition was compounded from 100 parts of polyvinyl chloride and 75 parts of the 3,5,5-trimethyl-1-hexyl phthalate. The composition was somewhat similar to that of Example 1 and had the following properties:

B. S. hardness _____ 59
Volume resistivity in ohm. cm. _____ $9 \times 10^{12}$

Example 3

A composition similar to those of Examples 1 and 2 was compounded, equal amounts of polyvinyl chloride and the nonyl phthalate being used. The composition had the following properties:

B. S. hardness _____ 91
Volume resistivity in ohm. cm. _____ $5 \times 10^{''}$

Example 4

100 parts of polyvinyl chloride was compounded with 50 parts of di-3,5,5-trimethyl-1-hexyl phthalate and 8 parts of white lead paste. The composition had the following properties:

B. S. hardness _____ 20
Volume resistivity in ohm. cm. _____ $6 \times 10^{13}$

Example 5

A composition was compounded in the same way as in Example 4, except that 60 parts of the phthalate were used. The composition had the following properties:

B. S. hardness _____ 33
Volume resistivity in ohm. cm. _____ 19×10¹²

Example 6

100 parts of polyvinyl chloride were compounded with 40 parts of di-3,5,5-trimethyl-1-hexyl phthalate and 20 parts of the chlorinated paraffin wax known as "Cerechlor" 11. No sweating of the material was observed even after prolonged storage.

Example 7

A composition containing 100 parts of polyvinyl chloride and 50 parts of di-3,5,5-trimethyl-1-hexyl adipate was gelled on an open mill at 160° C. The composition had a volume resistivity of 6×10¹¹ ohm. cm.

Example 8

10 parts of nitrocellulose and 10 parts of di-2,3,3-trimethyl-hexyl phthalate were dissolved in a mixture of 27 parts of butyl acetate, 8 parts of butyl alcohol and 52 parts of toluene.

The resultant solution was suitable for the preparation of films by the solvent-casting process, yielding clear films by that process.

Similar compositions may be obtained by replacing the phthalate by equal amounts of the corresponding adipate or sebacate.

These esters have little or no solvent action on the nitrocellulose but are compatible therewith, as is shown by the production of clear films as described above.

Example 9

A composition suitable for making transparent calendered sheet was compounded from the following:

|  | Parts |
|---|---|
| Polyvinyl chloride | 100 |
| Dinonyl phthalate | 50 |
| Calcium stearate | 4 |

The dinonyl phthalate was derived from nonanol containing 3,5,5-trimethyl-1-hexanol as its major constituent.

The composition had good ageing properties and heat-stability, was clear and substantially colourless, and had good mechanical properties, having at 20° C. a B. S. hardness of 21, a tensile strength of 2800 lbs./sq. in. and elongation at break of 350%.

Example 10

The following composition, suitable for use as extruded cable insulation, had good ageing properties, heat-stability, and flexibility, and had high volume resistivity.

|  | Parts |
|---|---|
| Polyvinyl chloride | 100 |
| Dinonyl phthalate | 50 |
| White lead | 3 |
| Calcium stearate | 1 |
| Titanium oxide | 3 |

The nonanol from which the dinonyl phthalate was derived had as its major constituent 3,5,5-trimethyl-1-hexanol.

The composition had a B. S. hardness at 20° C. of 21 and volume resistivity at the same temperature of 1×10¹⁴ ohm cm.

Example 11

The following is a typical composition suitable for use as extruded cable sheathing:

|  | Parts |
|---|---|
| Polyvinyl chloride | 100 |
| Dinonyl phthalate | 80 |
| Dinonyl sebacate | 20 |
| China clay | 50 |
| White lead | 8 |
| Ethyl palmitate | 1 |
| Carbon black | 1 |

This composition has good ageing properties, heat-stability, toughness, abrasion resistance and flexibility at low temperatures.

One batch of material compounded according to the above formula had the following properties:

B. S. hardness at 20° C. _____ 55
Tensile strength at 20° C. _____ lbs./sq. in. _ 1400
Elongation at break at 20° C. __ per cent __ 350
Cold-bend "brittle" temp. _____° C. __ —40 to —45

Example 12

The following composition has been found to be particularly valuable for use as extruded cable sheathing intended for use at very low temperatures, the composition being easily compounded, possessing good ageing properties and retaining its flexibility at very low temperatures.

|  | Parts |
|---|---|
| Polyvinyl chloride | 100 |
| Dinonyl adipate | 80 |
| White lead | 8 |
| Ethyl palmitate | 1 |
| Titanium oxide | 1 |

The phthalate was derived from nonanol containing 3,5,5-trimethyl-1-hexanol as its major constituent.

One batch of the above composition was found to have the following properties:

B. S. hardness at 20° C. _____ 59
Tensile strength at 20° C. _____ lbs/sq. in. __ 1900
Elongation at break at 20° C. __ per cent __ 380
Cold-bend "brittle" temp. _____° C. __ —65 to —70

Example 13

The following formula has been found to be suitable for extrusion as transparent conduit and belting, having good colour, clarity and heat stability.

|  | Parts |
|---|---|
| Polyvinyl chloride | 100 |
| Butyl nonyl phthalate | 60 |
| Calcium stearate | 4 |

The nonanol employed in preparing the butyl nonyl phthalate was composed primarily of 3,5,5-trimethyl-1-hexanol.

The composition had a B. S. hardness of 40 at 20° C.

Example 14

A lacquer was prepared by grinding 2 parts of carbon black into a composition having the following formula:

|  | Parts |
|---|---|
| Nitrocotton HL30/40 | 4 |
| Nitrocotton HX30/50 | 8 |
| Dewaxed damar | 3 |
| Dinonyl phthalate | 6.6 |
| Butyl acetate | 10 |
| Ethyl acetate | 15 |
| Butyl alcohol | 10 |
| Ethyl alcohol | 10 |
| Toluol | 31.4 |

I claim:

1. A composition of matter comprising a solid polymer of a substance selected from the group consisting of vinyl chloride, vinyl acetate, vinylidine chloride in combination with an ester of 3,5,5-trimethyl-1-hexanol and a polybasic organic acid selected from the group consisting of phthalic, adipic, sebacic, succinic, tartaric, aconitic and tricarballylic acids.

2. A composition of matter comprising a reaction product which is an interpolymer of a substance selected from the group consisting of vinyl chloride, vinyl acetate, and vinylidene chloride with acrylonitrile in combination with an ester of 3,5,5-trimethyl-1-hexanol and a polybasic organic acid selected from the group consisting of phthalic, adipic, sebacic, tartaric, aconitic and tricarballylic acids.

3. A composition as claimed in claim 1 wherein said ester is 3,5,5-trimethyl-1-hexyl phthalate.

4. A composition as claimed in claim 1 wherein said ester is 3,5,5-trimethyl-1-hexyl adipate.

5. A composition as claimed in claim 1 wherein said ester is 3,5,5-trimethyl-1-hexyl sebacate.

6. A composition as claimed in claim 1 wherein said polymer is an interpolymer of vinyl chloride and methyl methacrylate.

7. A composition as claimed in claim 1 wherein said polymer is an interpolymer of vinyl acetate and vinyl chloride.

HUGH G. REID.

REFERENCES CITED

The following references are of record in the file of this patent:

UNITED STATES PATENTS

| Number | Name | Date |
|---|---|---|
| 1,993,736 | Graves et al. | Mar. 12, 1935 |
| 2,015,077 | Lawson | Sept. 24, 1935 |
| 2,311,259 | Staff et al. | Feb. 16, 1943 |